Sept. 30, 1958    J. J. MACIEJOWSKI    2,854,128
APPARATUS FOR CONTROLLING ENDLESS BELTS
Filed Oct. 6, 1955
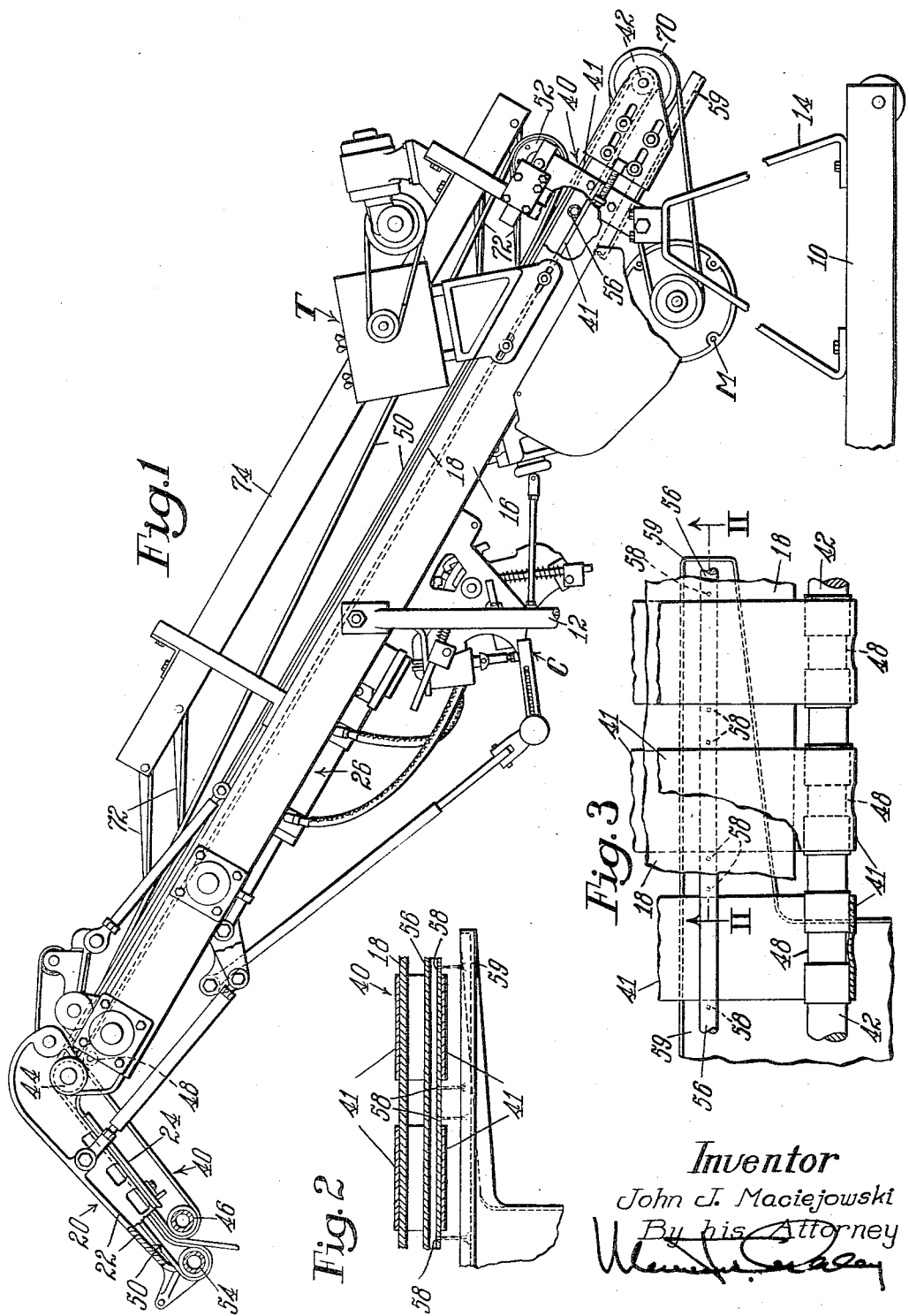
Inventor
John J. Maciejowski
By his Attorney United States Patent Office 2,854,128
Patented Sept. 30, 1958

2,854,128

APPARATUS FOR CONTROLLING ENDLESS BELTS

John J. Maciejowski, Wenham, Mass., assignor to United Shoe Machinery Corporation, Flemington, N. J., a corporation of New Jersey Application October 6, 1955, Serial No. 538,902

8 Claims. (Cl. 198—202)

This invention relates generally to the control of traveling endless belts and particularly to apparatus for causing a belt which is subject to undesirable lateral displacement to travel in a predetermined path. More particularly, the invention relates to conveyor systems having endless belts which are subject to lateral displacement due to an uneven absorption of moisture from work pieces conveyed by such belts. The preferred embodiment of the invention is herein illustrated in its application to a conveyor system, such as that embodied in an automatic leather stacking machine of the type described in United States Letters Patent No. 2,777,564, granted January 15, 1957, on an application filed in the name of George E. Russell, Jr. It is to be understood, however, that the present invention is not limited in its utility to leather stacking machines nor to transferring leather work pieces.

In conveying work pieces by means of endless belts it is necessary, or at least desirable, that the conveying belts travel in a straight path with little or no lateral displacement in order properly to control the movement of conveyed work pieces. In automatic stacking machines of the type illustrated in the above-mentioned patent a plurality of long, narrow belts are used to convey work pieces upwardly along an inclined frame and downwardly along a depending and oscillating delivery arm to discharge the work pieces in a work receiving zone beneath the delivery arm. Means are provided for oscillating the delivery arm in proper timed relationship to the passage of the mid-portion of the work pieces so that they will be properly balanced in most instances on a horse. For detecting the passage of a work piece along the main frame to determine the mid-portion thereof a number of work detecting fingers are arranged to lie in relatively narrow spaces between the conveying belts. Accordingly, any substantial lateral displacement of said belts would damage or at least hinder the effectiveness of the detecting fingers.

In conveying work pieces by means of long, endless belts it has been a problem to insure that such belts travel properly on their carrying pulleys within a small range of lateral displacement. To aid in belt tracking crowned pulleys have long been utilized for carrying the belts whereby theoretically the larger diameter of the crown causes the center portion of the belt to travel at a higher speed than the margins thereof, and in this manner a component of forces develops which must be neutralized by having equal portions of the belt on each side of the crown. Applicant has found in the conveying of dry work pieces that the use of crowned pulleys will cause the conveyor belts to track within the narrow range of lateral displacement necessary for use in automatic leather stacking machines of the type disclosed in the above-mentioned patent. However, when damp or wet work pieces are conveyed by the same method, the conveying belts absorb moisture from the work pieces in an uneven manner. The uneven absorption of moisture causes the belts to shrink unevenly and either run off the carrying pulleys or be displaced laterally to an unacceptable degree. It was found in the course of investigation that it was either impractical or not economical to utilize belts of a material that would be unaffected by moisture. However, when a belt deviates from its normal path due to uneven absorption of moisture, if water is applied to the belt margin having the least moisture, then the shrinkage tensions in the belt become equalized and the belt returns to its normal path. It was discovered that such an expedient was most effective when the belts were carried by pulleys in which the center portion of the pulley is of less diameter than the two edges thereof. Accordingly, an object of the invention is to provide means for selectively applying water to either margin of a belt for controlling lateral displacement in either of two directions whereby the belt is caused to track within a narrow range of lateral displacement. It is another object of this invention to provide the combination of pulleys having a smaller diameter in the center thereof for carrying said belt, together with automatic means for wetting either margin of a belt to control lateral displacement thereof.

For the purpose in view the machine herein shown is provided with a water pipe which extends transversely above the return runs of the conveying belts. A plurality of holes provided in the pipe allows water to drop freely by both margins of each belt without wetting said belts when they are centered on their carrying pulleys. If one of the belts absorbs moisture unevenly from work pieces being conveyed, thereby causing the belt to drift laterally in the direction of the driest margin of the belt, the so-called dry margin intercepts the flow of water adjacent thereto and becomes wet, thus causing that side of the belt to shrink and return to its normal position. To increase the effectiveness of the centering action of the belt, the belt carrying pulleys are so shaped that the center portion of the pulley is of lesser diameter than the edges thereof.

The above and other features of the invention will now be more particularly described with reference to the accompanying drawings and thereafter pointed out in the claims.

In the drawings,

Fig. 1 is a view in left-hand elevation of the machine to which the invention is herein shown as applied;

Fig. 2 is a section substantially on line II—II of Fig. 3, and

Fig. 3 is a fragmentary plan view on an enlarged scale of a portion of the machine with parts broken away to illustrate the invention.

The automatic leather stacking machine shown in Fig. 1 is of the basic type disclosed in United States Letters Patent No. 2,737,390, granted March 6, 1956, in the names of Paul E. Morgan, Arthur R. Abbott, and John J. Maciejowski. The machine is mounted on a roller base 10 from which supports 12 and 14 extend upwardly to carry side frames 16 (only one of which is seen) on either side of the machine. An upwardly inclined support 18 extends between the frames 16. A delivery arm 20 is pivotally secured at the upper end of said side frames and comprises two frame members 22 between which a member 24 extends in order to provide rigidity for the delivery arm. A fluid motor 26 acting through suitable linkage provides means for oscillating the delivery arm 20 through work delivering motions as controlled by a cam-controlled mechanism C and in a manner fully described in the above mentioned Patent No. 2,737,390.

A lower conveyor 40 passes around a roll 42 journaled at the lower end of the side frames 16 and has a work-engaging run extending upwardly along the inclined support 18, passing around a pivot roll 44 journaled at the upper end of said side frames and extending downwardly along the delivery arm 20. The lower conveyor 40 then passes around a roll 46 journaled in the members 22 of the delivery arm 20 to commence its return run. A roll 48 extending between the side frames 16 constrains the return run of the main conveyor so that it will properly clear the working elements of the machine as it passes to the roll 42.

A second, or upper, conveyor 50 passes around a roll 52 mounted above the frames 16 to commence a work-engaging run in contiguous relation with the work-engaging run of the lower conveyor 40. The work-engaging run of the upper conveyor 50 thus extends upwardly along the support 18, around the pivot roll 44, downwardly along the delivery arm 20, and around a roll 54 to commence its return run to the lower roll 52.

The upper and lower conveyors 50 and 40 each comprises a series of endless tapes 41 spaced across the support 18. The spacing between the tapes facilitates the detection of work pieces, and also it has been found that relatively narrow tapes provide ease of manufacture and assembly, as well as having better tracking characteristics. A motor M drives the lower conveyor 40 through a pulley 70 secured to the roll 42. No interconnection is made between the rolls of the upper and lower conveyor systems as it has been found that the friction between the contiguous runs of these two conveyors is sufficient for driving the upper conveyor.

Detector fingers 72 of the type described in United States Letters Patent No. 2,743,924, granted May 1, 1956, on an application filed in the names of Richard M. Elliott and Edmund S. Lee, III, extend between the tapes of the upper and lower conveyors 50 and 40 and enter recesses in the support 18. The fingers 72 are pivotally mounted on a framework 74 above the support 18 and are arranged in two stations so that they will be displaced as a work piece is conveyed up the support 18 and thereby selectively detect the passage of the leading and trailing edges of the work piece. The detection made by the fingers 72 is transmitted to a timing mechanism T of the type also described in the last-mentioned patent which actuates the cam controlled mechanism C to cause oscillation of the delivery arm 20. The upper and lower conveyors are driven constantly by the motor M, and in the operation of the machine leather work pieces are introduced at the lower end of the conveyor 40 either directly from a through feed leather treating machine or by means of some intermediate transfer means. The work pieces are carried upwardly between the conveyors 40 and 50, and as their leading and trailing edges pass the detector fingers 72, electrical impulses are transmitted to the timing mechanism T which initiate a computing cycle within the timing mechanism. The work pieces are carried around the pivot roll 44 and discharged from the lower end of the delivery arm 20. The timing mechanism T actuates the cam controlled mechanism C at a time dependent upon the work piece length as determined by the impulses transmitted in response to displacement of the fingers 72. The cam controlled mechanism C thereupon causes pressurized fluid to be introduced into one end of the fluid motor 26 dependent upon the initial position of the delivery arm 20. The delivery arm is thus oscillated through its linkage system in proper time relationship so that each work piece will be properly placed in a work-receiving zone. The mode of operation of the cam controlled mechanism C and timing mechanism T form no part of the present invention. Reference is therefore made to the above-mentioned patents for the details of their construction.

As previously mentioned, any substantial lateral displacement of the conveyor tapes would result in a serious interference with the detecting fingers 72. Accordingly, to aid in preventing lateral drifting of the tapes 41 the roller 42 (Fig. 3) has provided thereon a plurality of necked portions 48. The tapes are so carried by the roller that the margins of each tape run on portions of equal diameter of the roller, while the center portion thereof runs on a necked portion 48. The effect of such mounting causes both margins of each tape to be under a greater tension than is the center portion thereof, thus setting up opposing forces in the tape which must be balanced or equalized by having equal portions of the tape on each side of the necked portion 48.

Further to prevent lateral drifting of the tapes, the machine is provided with a water pipe 56 secured to the side frames 16 in a suitable manner. The pipe is connected to a source of water (not shown) and extends transversely above the return run of the conveyor 40. A number of pairs of small holes 58 are provided in the bottom of the pipe, the holes of each pair being spaced apart a distance slightly greater than the width of the individual tapes 41. Thus, when the tapes are tracking properly on the roller 42, water emitting from the holes 58 will not strike the tapes but will pass freely through the spaces between the tapes in a manner illustrated in Fig. 2. However, in conveying damp or wet work pieces some tapes absorb moisture unevenly so that one margin thereof tends to shrink more than the other, causing the wet margin to drift toward the center necked portion 48 of the roller due to its increased tension. As the tape begins to drift laterally the drier margin of the tape intercepts a stream of water emitting from one of the holes 58 causing that margin to shrink and counteract the uneven forces set up in the other margin. As a result, to equalize the opposing forces in the tape, the tape must return to its original position on the roller with equal portions of the tape running along either side of the necked portion 48. To accommodate the water which is constantly flowing from the holes 58 in the pipe 56 a tray 59 is mounted on the machine in a position underlying the tapes 41 and the pipe 56 so that the water flowing from the holes 58 may be collected and conducted away from the work area.

Having thus described my invention, what I claim as new and desire to secure by Letters Patent of the United States is:

1. In apparatus for controlling endless traveling belts subject to lateral deviations from a desired normal path, the combination of pulleys for carrying a belt, and means for applying a shrinking medium to a margin of said belt when said belt deviates from a predetermined normal path, whereby the increased tension of said margin of said belt causes said belt to return to said path.

2. In apparatus for controlling endless traveling belts subject to lateral deviations from a desired normal path, the combination of pulleys for carrying a belt, and means for applying a shrinking medium to one margin of said belt when increased tension of the other margin thereof causes said belt to deviate from a predetermined normal path whereby the tensions of both margins become equalized, causing said belt to return to said path.

3. In apparatus for controlling endless traveling belts subject to lateral deviations from a desired normal path, the combination of pulleys for carrying a belt, said pulleys being so shaped that the marginal portions of said belt carried thereby are under greater tension than the center portion of said belt, and means for applying a shrinking medium to a margin of said belt when said belt deviates from a predetermined normal path whereby the increased tension of said margin of said belt causes said belt to return to said path.

4. In apparatus for controlling endless traveling belts subject to lateral deviations from a desired normal path, the combination of pulleys for carrying a belt, and means for applying water to one margin of said belt when said belt deviates from a predetermined normal path whereby the tension of said margin increases, causing said belt to return to said path.

5. In apparatus for controlling endless traveling belts subject to lateral deviations from a desired normal path, the combination of pulleys for carrying a belt, said pulleys being so shaped that the marginal portions of said belt carried thereby are under greater tension than the center portion of said belt, and means for applying water to one margin of said belt when said belt deviates from a predetermined normal path whereby the tension of said margin increases to cause said belt to return to said path.

6. In apparatus for controlling endless traveling belts subject to lateral deviations from a desired normal path, the combination of pulleys for carrying a belt, and a pipe extending transversely above said belt, said pipe being connected to a source of water and having holes therein spaced apart a distance slightly greater than the width of said belt, said holes being so arranged that jets of water emitting from said holes fall freely by both margins of said belt when said belt is traveling in a predetermined normal path but also so arranged that a jet of water will be intercepted by one or the other margin of said belt when said belt deviates laterally in either of two directions.

7. In apparatus for controlling endless traveling belts subject to lateral deviations from a desired normal path, the combination of pulleys for carrying a belt, said pulleys being so shaped that the marginal portions of said belt carried thereby are under greater tension than the center portion of said belt, and a pipe extending transversely above said belt, said pipe being connected to a source of water and having holes therein spaced apart a distance slightly greater than the width of said belt, said holes being so arranged that jets of water emitting from said holes fall freely by both margins of said belt when said belt is traveling in a predetermined normal path but also so arranged that a jet of water will be intercepted by one or the other margin of said belt when said belt deviates laterally in either of two directions.

8. In apparatus for conveying work pieces by means of endless belts which are subject to lateral displacement due to an uneven absorption of moisture, the combination of pulleys for carrying said belts, each of said pulleys being so shaped that the marginal portions of each of said belts being carried thereby are under greater tension than the center portion of each belt, means for driving said pulleys, and a pipe extending transversely above said belts, said pipe being connected to a source of water and having holes therein, said holes being so arranged that jets of water emitting from said holes fall freely by both margins of each of said belts when said belts are traveling in predetermined normal paths but also so arranged that a jet of water will be intercepted by a margin of any of said belts when any of said belts deviates laterally in either of two directions.

References Cited in the file of this patent

UNITED STATES PATENTS

| | | |
|---|---|---|
| 169,573 | Parr | Nov. 2, 1875 |
| 878,815 | Martin | Feb. 11, 1908 |
| 2,330,923 | Robins | Oct. 5, 1943 |
| 2,355,448 | Krotz | Aug. 8, 1944 |